United States Patent [19]

Ojima

[11] Patent Number: 5,004,448
[45] Date of Patent: Apr. 2, 1991

[54] TENSIONER

[75] Inventor: Juji Ojima, Aikawa, Japan

[73] Assignee: NHK Spring Co., Ltd., Yokohama, Japan

[21] Appl. No.: 448,850

[22] Filed: Dec. 12, 1989

[30] Foreign Application Priority Data

Dec. 29, 1988 [JP] Japan .................. 63-331952

[51] Int. Cl.⁵ .................. F16B 2/02; F16B 21/00; F16D 3/26
[52] U.S. Cl. .................. 474/111; 188/166; 267/70; 267/168; 474/138
[58] Field of Search .............. 474/109, 110, 111, 136, 474/133, 138, 135, 101, 115, 117; 188/166; 192/8 C, 12 BA; 267/69, 70, 71, 166, 168

[56] References Cited

U.S. PATENT DOCUMENTS

| 99,475 | 2/1870 | Rhinelander | 267/166 |
|---|---|---|---|
| 3,246,868 | 4/1966 | Martens et al. | 188/166 |
| 3,405,791 | 10/1968 | Kaplan | 188/166 |
| 4,392,840 | 7/1983 | Radocaj | 474/117 |
| 4,457,741 | 7/1984 | Hoeptner | 474/138 |
| 4,533,027 | 8/1985 | Otani et al. | 192/8 C |
| 4,696,663 | 9/1987 | Thomey et al. | 474/133 |
| 4,725,260 | 2/1988 | Komorowski et al. | 474/135 |

Primary Examiner—Stephen J. Novosad
Attorney, Agent, or Firm—Fleit, Jacobson, Cohn, Price, Holman & Stern

[57] ABSTRACT

In a tensioner, a friction brake locks the advancement of a tension rod by a friction force provided and a tension rod advances from a casing by the pressurizing of the compression spring to maintain a belt, chain or the like in a suitable tension state. A coil portion is outwardly inserted through the tension rod in a closely contacted state and one end of the coil portion is latched to the casing, while another end forms a friction brake which is an operation end to cause an enlargement or the shrinkage of the diameter of the coil portion, by which the advancement and the removal of the tension rod is performed.

5 Claims, 3 Drawing Sheets

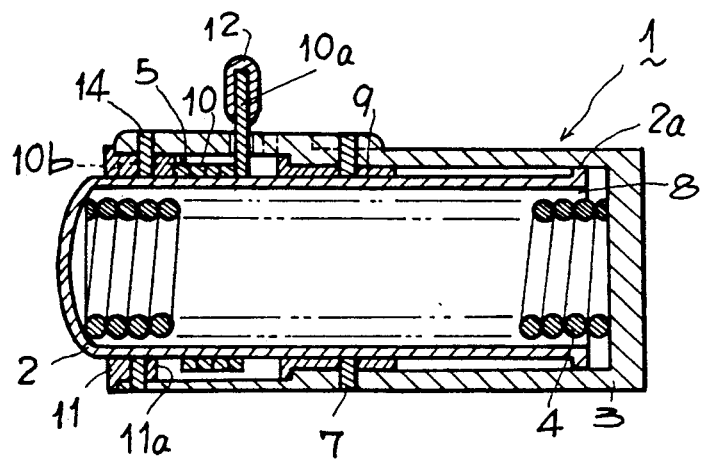
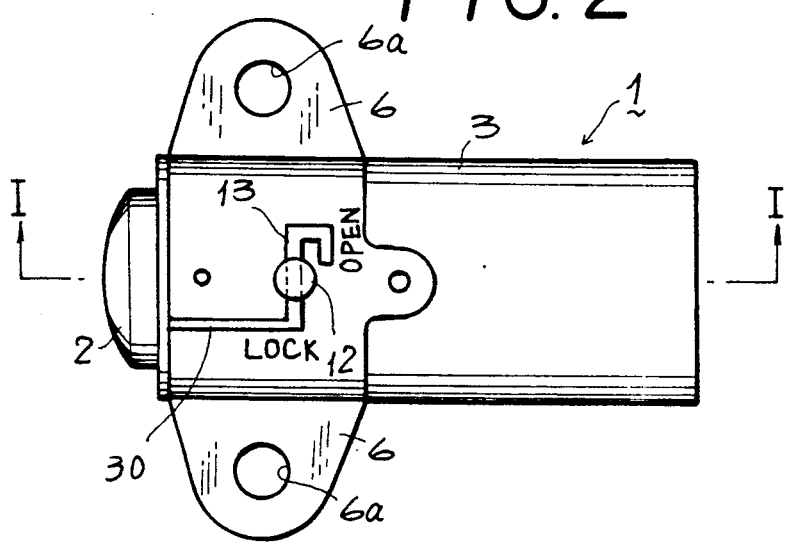
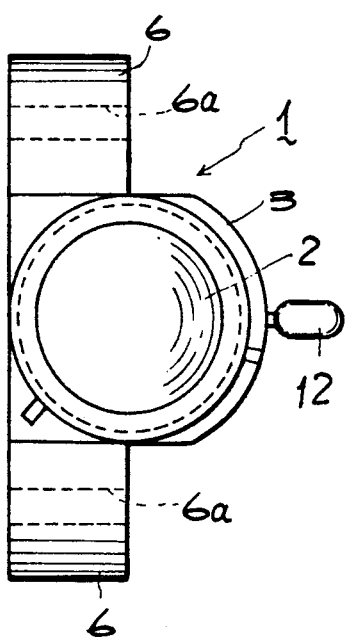

TENSIONER

BACKGROUND OF THE INVENTION

This invention relates to a tensioner which maintains a belt or chain of an internal combustion engine in a suitable tension state.

In the tensioner, a tension rod energized by a spring force abuts againsts a belt, chain or the like directly or indirectly through a pulley thereby providing a fixed stress to the belt or the chain by the urged force thereof. For this purpose, in a fundamental construction of the tensioner, a tension rod is provided in a casing so as to be able to advance and a spring for advancing the tension rod is provided in the casing. However, since such tensioner is energized by a spring, this has such dangers as an unexpected advancement of the tension rod and the projecting form the casing before assembling of a device or at the time of removing it from the device. For this purpose, the tensioner is provided with a stopper mechanism which locks the advancement of the tension rod. In the traditional stopper mechanism a hole having a small diameter is formed in both the tensioner and the casing, and the advancement of the tension rod is locked by inserting the stopper pin into each pin hole of the tensioner and the casing during insertion of the stopper pin. After assembling the tensioner to the device, the urging operation of the tension rod due to the spring force is performed by drawing out the stopper pin.

However, in the traditional stopper mechanism when the stopper pin is drawn out, it is necessary to align the casing and the tension rod for inserting the stopper pin through the pin hole of the tension rod. However, this positioning is very difficult. Further, the locking portion with the stopper pin is only one portion with respect to the advancing direction of the tension rod and locking of the tension rod of an arbitrary position is impossible. By this, since the removal of the tensioner for maintenance is performed in a state wherein the advancing force is loaded on the tension rod, the whole tensioner is twisted to gnaw at a bolt as the bolt is slackened which increases the difficulty of the removing of the tension rod.

This invention is an improvement over the above cases, and provides a tensioner in which it is possible to lock the tension rod at an arbitrary position with a simple operation, easily and securely.

BRIEF SUMMARY OF THE INVENTION

In order to achieve the above the object, this invention is provided with a friction force. In other words, this invention is characterized in that in a tensioner wherein the tension rod advances from the casing by energizing a compression spring to maintain a belt or a chain in a suitable tension state, a coil portion is outwardly inserted through the tension rod in a closely contact state and a friction brake, wherein one end thereof being latched with the casing and another end thereof being an operation end which performs enlarging and shrinking of a diameter of the coil portion, is provided with the friction brake thereby preventing the advancement of the tension rod and the removal thereof.

The friction brake locks the advancement of the tension rod by a friction force in a closely contacting state of the brake to the tension rod. When the operation end is operated so that diameter of the coil portion is enlarged, the friction force is removed, the tension rod is in an unlocked state.

BRIEF DESCRIPTION OF THE DRAWINGS

FIG. 1, FIG. 2 and FIG. 3 represent a first example of this invention and are a sectional view, a side view and an elevation view taken on line I—I in FIG. 2 respectively.

DETAILED DESCRIPTION OF THE INVENTION

Figure 4:
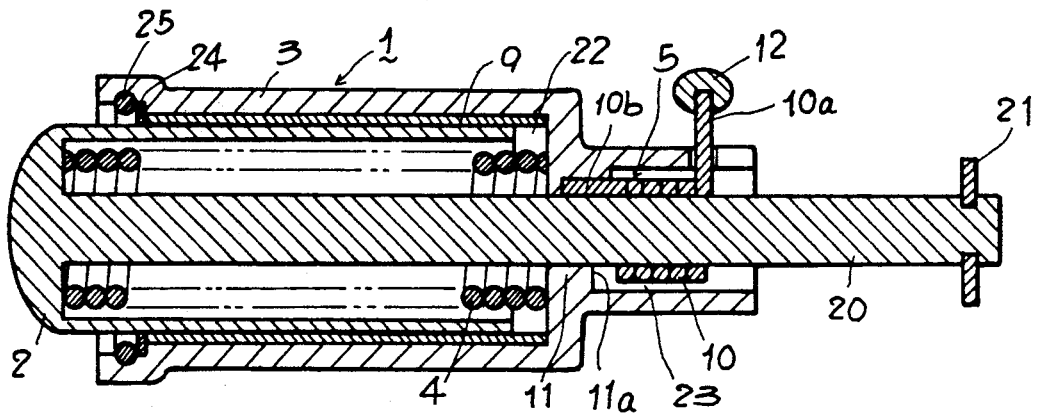
FIG. 4 and FIG. 5 are a side sectional view and a side view of a second example repectively.

Now, some examples according to this invention will be described hereinafter with reference to the accompanying drawings. In explaining the drawings, the same element is shown with the same number.

FIG. 1, FIG. 2 and FIG. 3 represent the first example of this invention. The tensioner 1 is provided with a cylindrical casing 3, a tension rod 2 inserted into the casing 3 so as to be able to advance and retreat, a compression spring 4 secured between the casing 3 and a tension rod 2 and a friction brake 5 which locks the advancement of the tension rod 2.

In the casing a securing piece 6 for fixing the tensioner 1 to a suitable fixing member is formed so that it may project to both sides thereof, the securing piece 6a being provided with a securing hole 6 wherein a bolt penetrates therethrough.

The top end side (left side) of the casing 3 is opened and the tension rod 2 is inserted from the open end side.

In the tension rod 2, a bored hole 8 opened to the bottom side of the casing 3 is formed in an axial direction.

A guide 9 is inserted suitably between tension rod 2 and casing 3 so that the advancement and the retreatment of the tension rod 2 may be performed stably. Further, a flange piece 2a extending outwards is formed at the base side of the tension rod 2 and when the flange piece 2a abuts the guide 9, the advancement of the tension rod 2 is stopped. In other words, the distance between the flange piece 2a and the guide 9 forms an effective stroke length of the tension rod 2.

This guide 9 is fixed by a stopper pin 7 pentrating into the guide 9 and the casing 3 so that it may not move by the friction force between tension rod 2 and guide 9 due to the advancement of the tension rod 2.

The compression spring 4 is inserted into the penetrated hole 8 of such tension rod 2, one end thereof abutting against the back surface of the top end portion of the tension rod 2 and another end abutting against the bottom portion of the casing 3 thereby providing an advancing force in an axial direction to the tension rod 2. By providing such compression spring 4 positioned in an axial direction of the tension rod 2, the tension of the belt or the chain can be maintained within a suitable range, because it energizes the advancement of the tension rod 2 and enables a compression response to a reaction force when the reaction force is due to an excess tension to the tension rod 2.

The friction brake 5 is composed of a locking spring 10 for locking consisting of a coil spring outwardly inserted through the tension rod 2 and a bearing 11 secured adjacent to the locking spring 10. The friction force of the locking spring 10 is caused by an inner diameter of the coil of said locking spring 10 being wound to be somewhat smaller in diameter than the outer diameter of the tension rod so that the locking spring 10 may impart a friction force to the tension rod 2. In this example, the twisted spring 10 is formed by a wire rod having a rectangular sectional area thereby increasing a contact area with tension rod 2. One end portion 10b of the coil portion is bent in the axial direction and inserted to latch into a latching hole of the bearing 11, another end portion 10a being bent in a diameter direction of the casing 3. End portion 10a of this locking spring 10 is drawn out from the casing 3 outwardly, and at the drawing out end portion thereof a knob 12 being provided. In FIG. 2, the numeral 13 is a slit formed in the casing 3 so that end portion 10a of the locking spring 10 may be drawn out. When the knob 12 is allowed to slide in the locking direction along the slit 13, to the lock position the coil diameter of the locking spring 10 shrinks whereby the advancement of the tension rod 2 is locked against by energized force of the locking spring 10 for exerting the friction force to the tension rod 2. On the contrary, when the knob 12 is allowed to slide in an opening to the open position, the coil diameter of the locking spring 10 is enlarged whereby the locking is removed and the tension rod 2 is energized to advance by the spring force of the compression spring 4.

The opening side in the slit 13 is bent to be "C" type. When the knob 12 is moved to the end portion thereof, the automatic return of the knob 12 is prevented. By this, an enlarged state of the diameter of the locking spring 10 is maintained and the tension rod 2 is energized to advance by the coil spring 4 whereby the operation of the tensioner 1 moves to a successive state.

On the other hand, the bearing 11 is positioned at the opening side of the casing 3 with respect to locking spring 10, and the end surface of the locking spring 10 forming a taper surface 11a having a fixed inclined angle. Further, the "lock" side end portion of the slit 13 bent in the advancing direction of the tension rod to form a guide slit 30 which opens to the top end surface of the casing 1. The end portion 10a of the locking spring 10 is guided by this guide slit 30 to attach within the casing 1. On the other hand, the bearing 11 is positioned to the opening side of the casing with respect to the locking spring 10 and the end surface of the locking spring 10 side forms a taper surface 11a. The bearing 11 is secured to the opening of the casing 3 to seal the open end side of the casing 3 and the tension rod 2 is inserted therein whereby the bearing 11 serves as a guide for the movement of the tension rod.

In FIG. 1, the numeral 14 is a fixed pin for securing the bearing 11 to the casing 3. The locking spring 10 side of such bearing 11 forms a tapered surface and the coil portion of the locking spring 10 moves along the tapered surface by energizing the tension rod 2 in a locking state in an advancing direction with the compression spring 4 whereby a clamping force to the tension rod 2 due to a reduce diameter of the coil portion operates so as to increase safety.

In such an example, since the clamping to the tension rod 2 by the friction brake 5 is always performed by the operation of knob 12, the locking of the advancement of the tension rod 2 can be performed at an arbitrary position at any intermediate position. Accordingly, the detaching of the tensioner can be performed in a state having no load of compression spring 4 by locking the tension rod 2 in an advanced state at the detaching time of the tensioner for maintenance and the like and an excess advancement of the tension rod 2 can be prevented, in safety.

Figure 5:
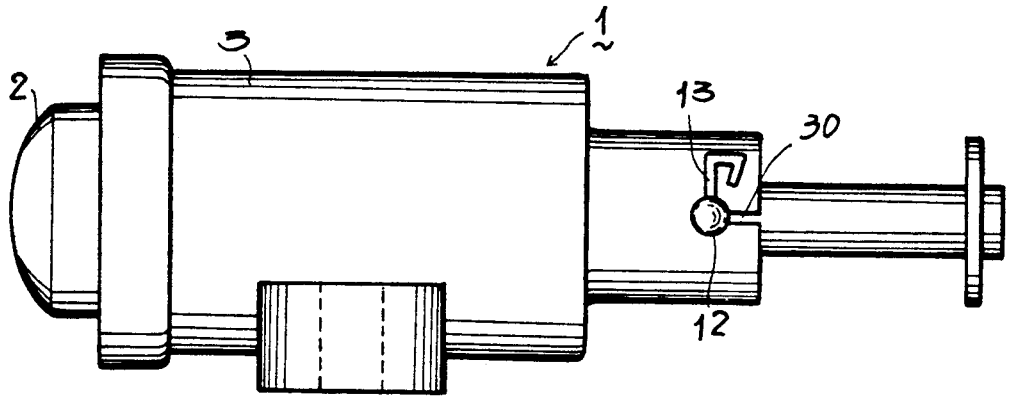

FIG. 4 and FIG. 5 represent the second example of this invention. The same element as the first example is shown by the same reference numeral. In this example, a shaft 20 extending in the axial direction is located at the central portion of the tension rod 2 and this shaft 20 is drawn out toward the outside from the base side of the casing 3. At the drawing out end portion of the shaft 20, is secured a stopper 21 which stops the coming out of the tension rod 2 from the casing 3.

On the other hand, the casing 3 is separated by the bearing 11 to the first separating chamber 22 wherein the compression spring 4 and the tension rod 2 are contained therein and the second separating chamber 23 where the friction brake 5 is contained therein.

The top end of the first separating chamber is open, and in the open end portion thereof is fixed a bearing plate 24 to be a guide for the tension rod 2. A circlip 25, located at the inner portion of the casing 3, guides the moving of the tension rod by holding the tension rod between the bearing plate 24 and the bearing 11. On the other hand, within the second separating chamber 23 is provided locking spring 10 and tapered surface 11a at the side of the bearing 11 of the locking spring 10.

In this case, the locking spring 10 is outwardly inserted into a shaft 20 of the tension rod 2, one end 10b thereof being inserted into the bearing 11 to be latched with it, whereby the advancement of the tension rod is adapted to be locked at any intermediate position by the friction force thereof. In such second example, since the friction brake 5 acts on shaft 20 of the tension rod 2, a coil spring having a small diameter can be used as a locking spring 10, whereby the locking operation can be implemented easily by positioning the locking mechanism at the opposite side against the advancing side of the tension rod 2.

Figure 6:
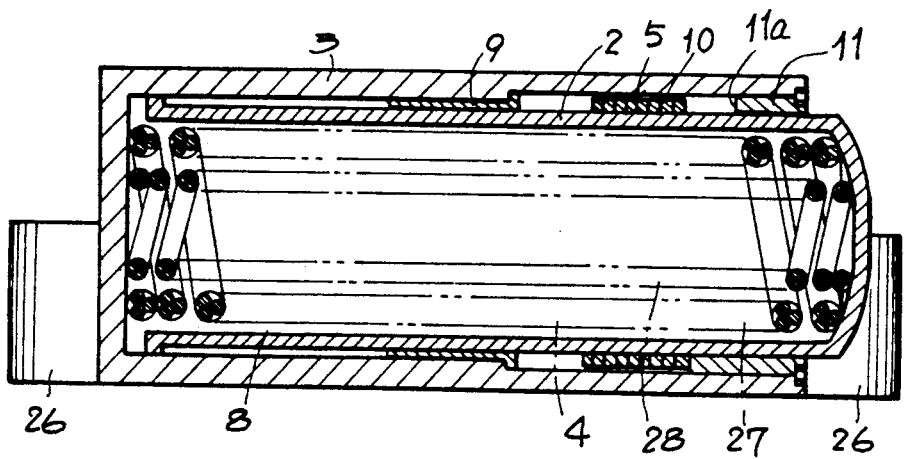
FIG. 6, FIG. 7 and FIG. 8 represent a third example and are a sectional view, a side view and a rear elevation taken on line VI—VI in FIG. 7, respectively.
Figure 7:
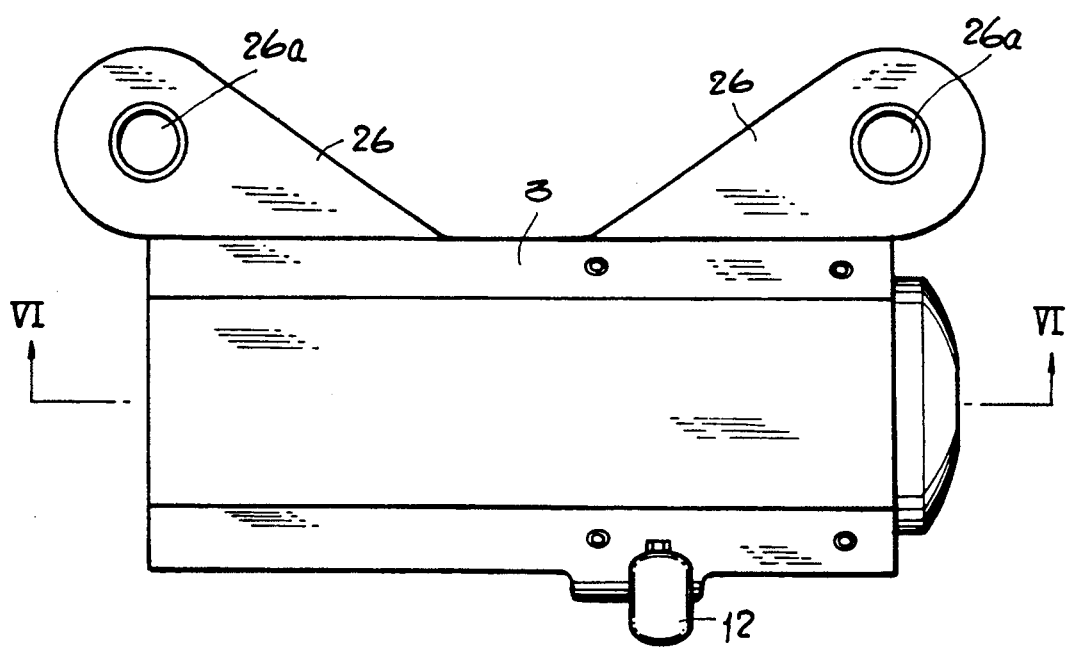
Figure 8:
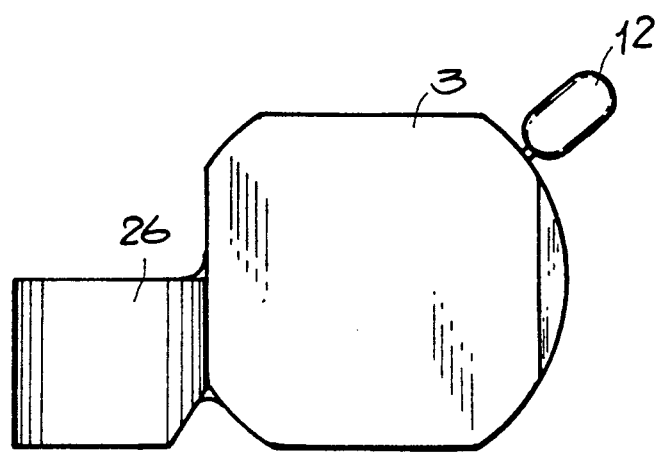

FIG. 6, FIG. 7 and FIG. 8 illustrate a third example of this invention. In this example, the casing 3 is provided integrally at the side of the supporting block 26, the interior of the casing 3 being provided with tension rod 2, guide 9 and friction brake 5 consisting of locking spring 10, and bearing 11 having the taper surface 11a at the side of the locking spring 10. Further, the compression spring 4 is provided at the penetrated hole 8 of the tension rod 2, said compression spring 4 consisting of an outer spring 27 having a large diameter and an inner spring 28 having a small diameter, said springs 27 and 28 biasing the tension rod 2.

Furthermore, the outer spring 27 and inner spring 28 in this example are made of wires. The spring made by such an element thereby being able to decrease a resonance energy of the belt or chain.

As described above, since the friction brake which locks the advancement of the tension rod by the friction brake 5 which locks the advancement of the tension rod by the friction force of the spring, is provided in this invention. The tension rod can be locked at an arbitrary position thereby increasing ease of maintenance and safety.

What I claim is:

1. A tensioner comprising
   a casing,
   a tension rod movably mounted in the casing,
   a compressing spring mounted in the tension rod between one end of the casing and one end of the tension rod for energizing the tension rod in an advancing direction, and a friction brake having a coil portion, one end of the coil portion being latched with a rear end of an axially tapered surface formed on the casing for producing a wedging effect, while another end of the coil portion being an operation end being fixable in a locking position for preventing advancement of the tension rod and in an open position for releasing the tension rod.

2. A tensioner according to claim 1, wherein the tension rod is provided with a shaft extended in an axial direction of the tension rod, said shaft being supported by a bearing provided to the casing, and further being inserted through the coil spring of the friction brake.

3. A tensioner according to claim 1, wherein the compressing spring is springs coiled by twisting more than two element wires.

4. A tensioner according to claim 1, wherein the compressing spring includes two springs.

5. A tensioner according to claim 1, wherein the compressing spring is coiled by twisting more than two element wires.

* * * * *